Oct. 28, 1924. 1,513,378
G. J. DORMANDY
FOLDING MACHINE
Filed June 23, 1923 7 Sheets-Sheet 4
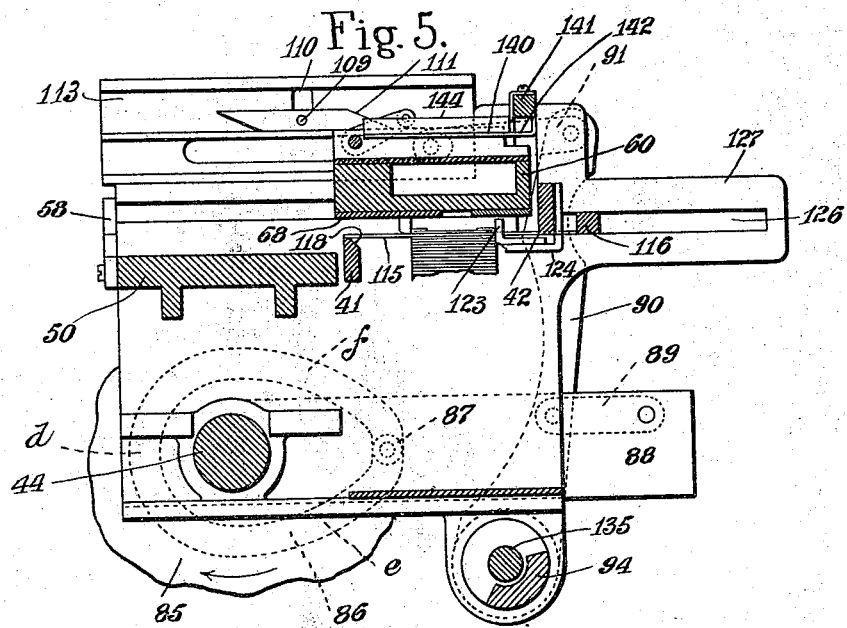
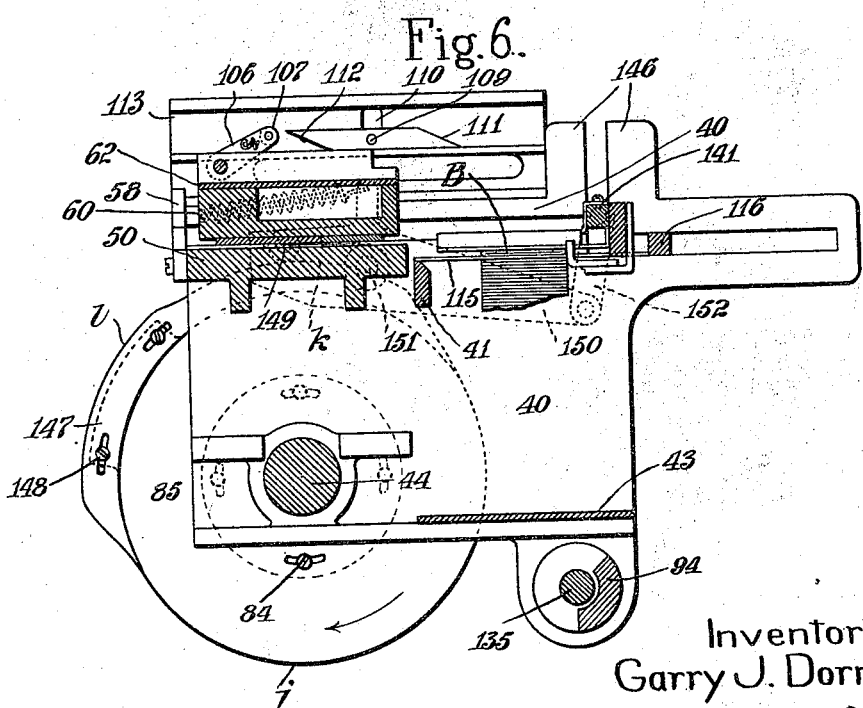
Inventor.
Garry J. Dormandy
by Rogers, Kennedy & Campbell,
Attys.

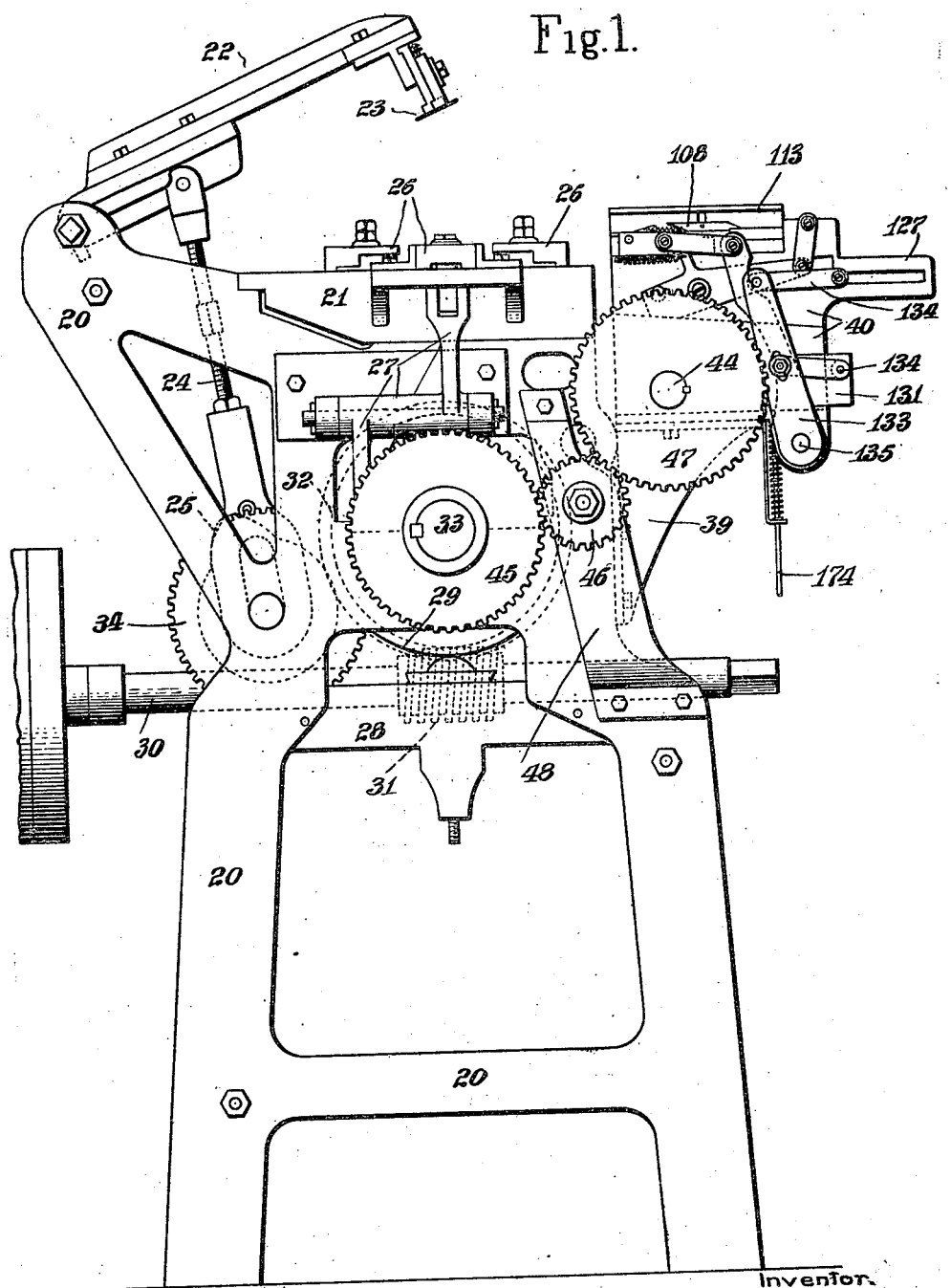

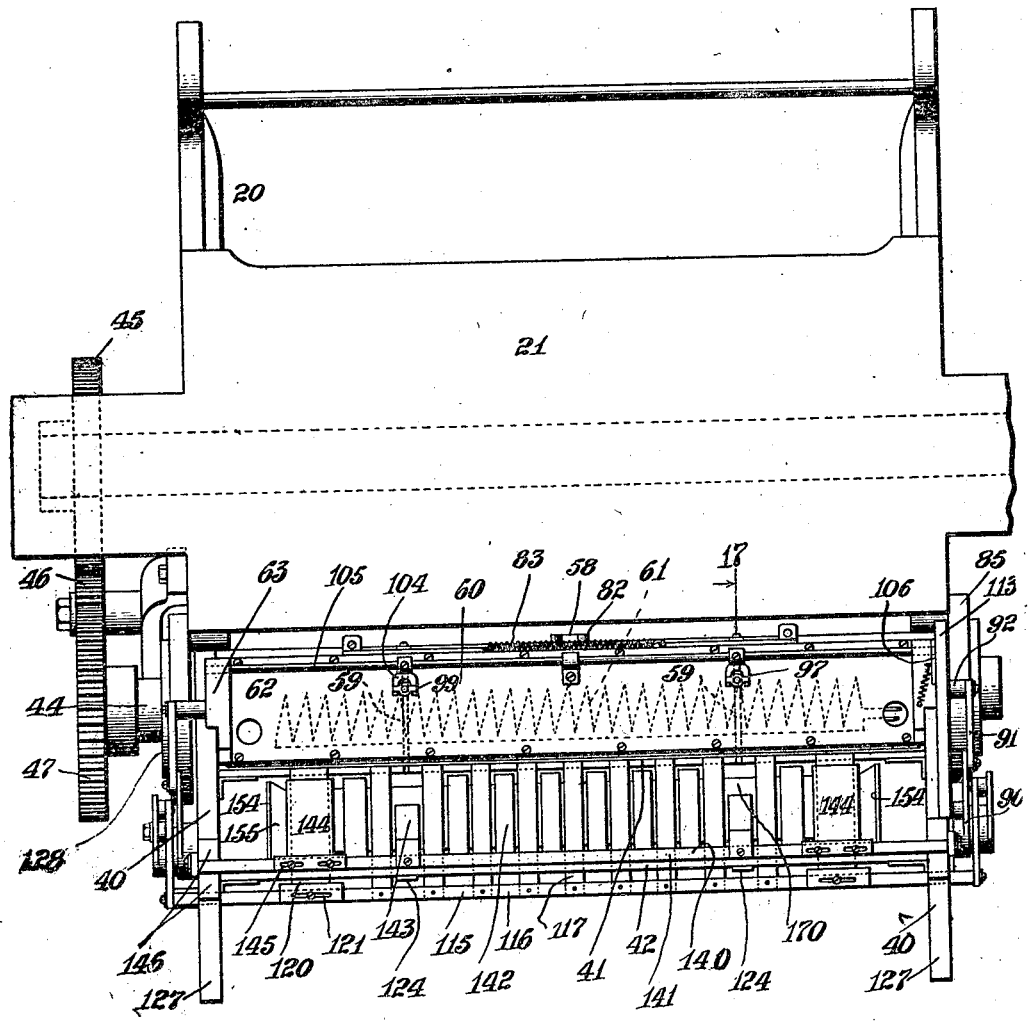

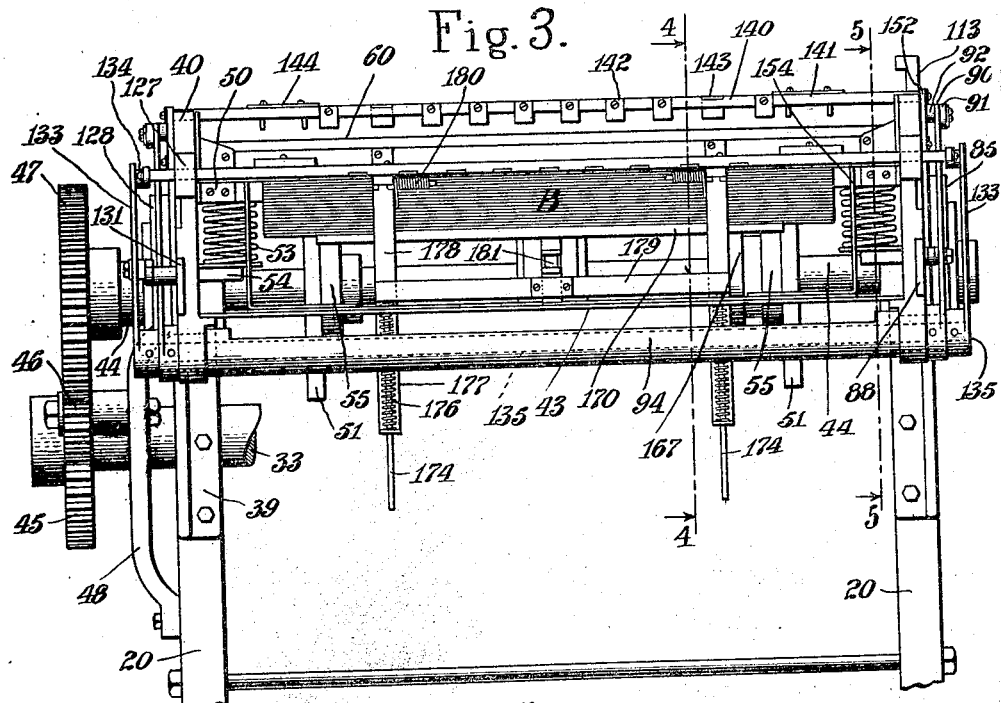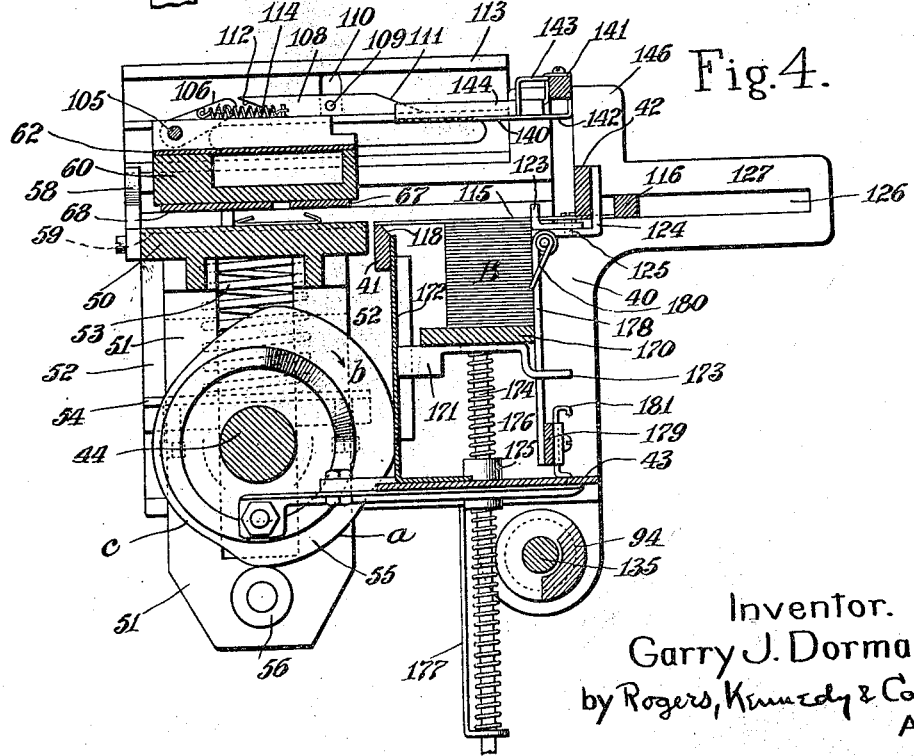

Oct. 28, 1924.

G. J. DORMANDY 1,513,378

FOLDING MACHINE

Filed June 23, 1923

Inventor.
Garry J. Dormandy
by Rogers, Kennedy & Campbell,
Attys.

Oct. 28, 1924.
G. J. DORMANDY
1,513,378
FOLDING MACHINE
Filed June 23, 1923    7 Sheets-Sheet 7
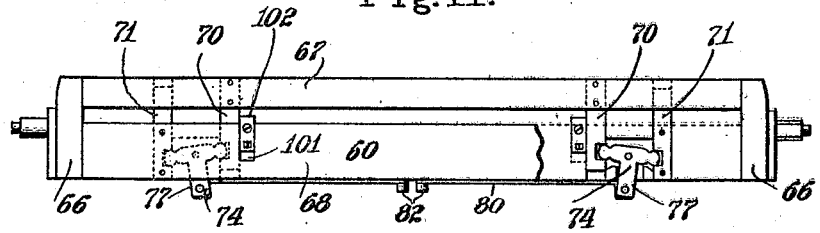
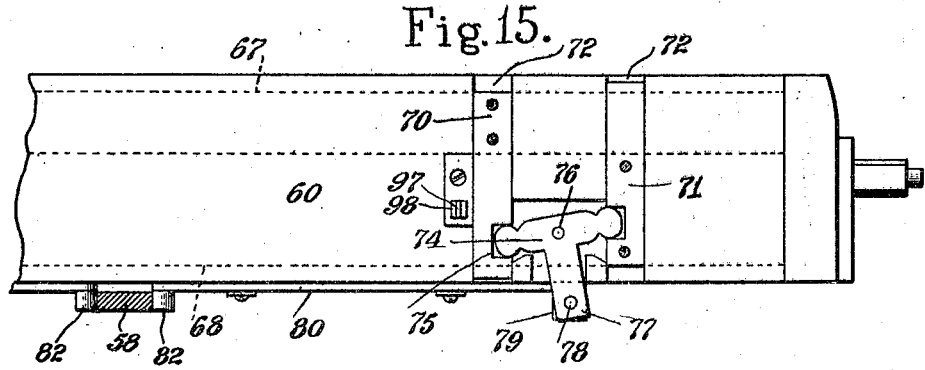
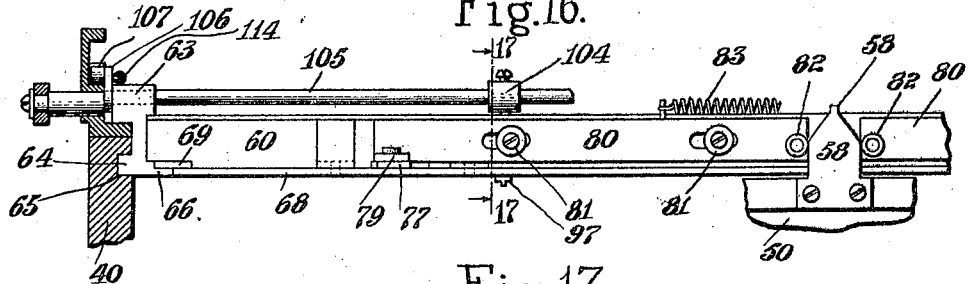
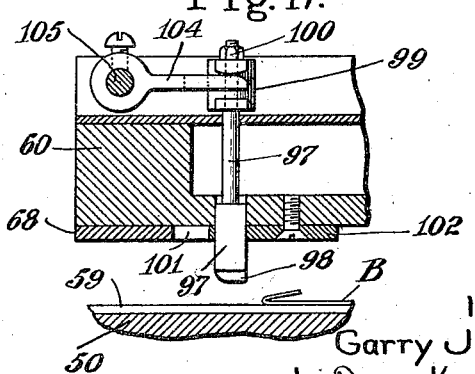
Inventor:
Garry J. Dormandy
by Rogers, Kennedy & Campbell,
Attys.

Patented Oct. 28, 1924.

1,513,378

UNITED STATES PATENT OFFICE.

GARRY J. DORMANDY, OF TROY, NEW YORK, ASSIGNOR TO LION COLLARS & SHIRTS, OF TROY, NEW YORK, A CORPORATION OF NEW YORK.

FOLDING MACHINE.

Application filed June 23, 1923. Serial No. 647,305.

*To all whom it may concern:*

Be it known that I, GARRY J. DORMANDY, a citizen of the United States, residing at Troy, in the county of Rensselaer and State of New York, have invented certain new and useful Improvements in Folding Machines, of which the following is a specification, reference being had therein to the accompanying drawing.

This invention relates to improvements in folding machines, more particularly folding machines used in the manufacture of collars and cuffs, in which the cloth blanks have to be first folded in, entirely or partially around their margins, preparatory to the stitching together of two of such blanks. A machine of this class is usually provided with a bed on which the successive blanks are placed, and a die or templet which is positioned upon the blanks, and infolders which move in from the sides to fold the margins of the blanks over the edges of the templet, which defines the shape. Heat and pressure are usually applied in order that the folds will be fixed or creased, as otherwise the material might fail to hold its folded shape, giving considerable difficulty in the subsequent stitching operations.

The present invention pertains more particularly to the treatment of each folded blank after its disengagement from the bed, templet and infolders, and one feature of the present invention is that its mechanism may be a separate entity, adapted to be attached to and connected up with any desired folding machine for the purpose of effecting the supplemental treatments referred to.

An important purpose of the present invention is to afford a convenient and effective pressing of the blanks immediately after removal from what may be termed the main machine, and followed by a stacking or bunching of such finally pressed blanks. To this end my invention provides a mechanism which may be geared or otherwise connected to operate in coordination with the main machine, and which mechanism may receive each folded blank and give it a second or final pressing, thereafter feeding and grouping or stacking the blanks in bunches of suitable size. As an example, the present invention may be applied, as an attachment or otherwise, to a folding machine wherein the templet is not extracted from the folded blanks while on the bed, but in rising, in each cycle of operation, carries the blank upward with it, so that the folded blank may readily be detached, by hand or otherwise, and quickly positioned upon the receiving member or pressure table of this invention. The operations of pressing and stacking are herein shown synchronized with the movements of the templet and infolders in such a way that while the templet is elevated the operator may effect a rapid detachment from the templet of the folded blank, shifting it to the receiving member, and placing a new unfolded blank upon the bed of the main machine, to be defined by the templet and folded. In this way as one blank is being folded, the preceding blank is being finally pressed, and the blank ahead of that is being stacked or bunched.

Another purpose of the present invention is to apply heat, in the second or final pressing, at the top of the blank, against the folds, thus giving a very effective creasing and fixing of the folds, and moreover supplementing the usual pressing in the main machine, wherein heat is applied by the bed, therefore from underneath. Another purpose is to afford an action of smoothing down the folds in the act of applying the second or final pressing, thus insuring that any partly open folds will be laid down properly before the pressure is applied.

Another object of the present invention is to permit adjustments of mechanism for varying lengths and widths of blanks. A general object is to secure the recited advantages in a mechanism which will be durable and effective, and which will permit quicker operation and with less strain on the operator, and yielding a better product, than with folding machines heretofore known.

Other objects and advantages will be elucidated in the hereinafter following description of one form or embodiment of the invention or will be understood to those skilled in the art.

To the attainment of such objects and advantages the present invention consists in the novel folding machine, and the novel features of construction, combination, operation, method, arrangement and detail herein illustrated or described.

In the accompanying drawings Fig. 1 is what may be considered a left elevation of a folding machine embodying the principles of the present invention. As an example, this machine may be adapted for the infolding of collar bands, a long narrow shape requiring folds on all four sides. The main machine is herein shown only in a general way, without going into detail, as the details may be varied indefinitely, and may be, for example, as shown in my prior Patent 1,054,094 of February 25, 1913, to which reference may be made for details not herein particularly described.

Fig. 2 is a general top plan view of the machine shown in Fig. 1 with, however, the templet, infolders and certain other parts omitted.

Fig. 3 is a front elevation of the present invention, showing very little of the main machine beyond the operating shaft and a few frame parts.

The remaining figures show no parts of the main machine, but only the attachment or attached mechanism which embodies the features of the present invention.

Fig. 4 is a left elevation, partly in section on the line 4—4 of Fig. 3.

Fig. 5 is a left elevation, partly in section on the line 5—5 of Fig. 3, the parts at a different stage of operation than in Fig. 4.

Fig. 6 is a view similar to Fig. 5 with the parts in a still different stage of operation.

Figure 7:
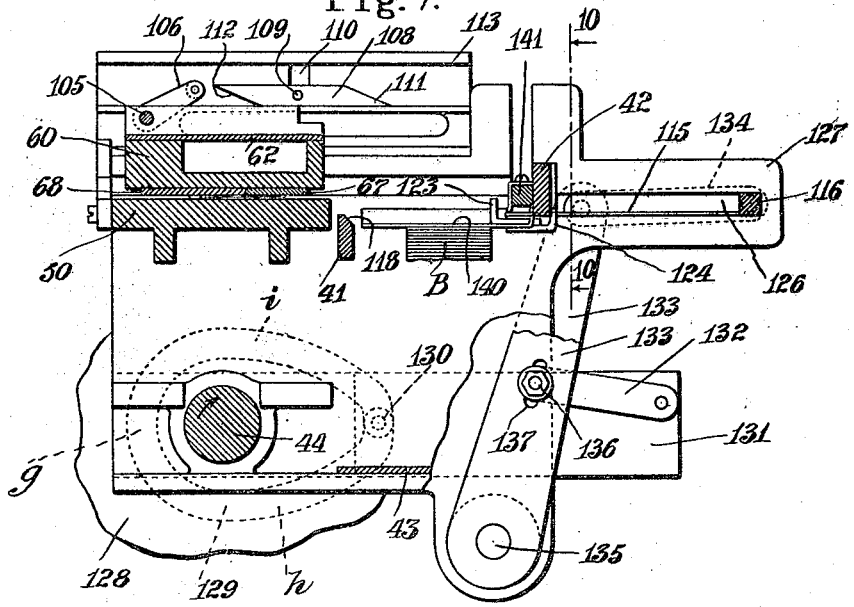

Fig. 7 is a similar view with the parts in a still different stage.

Figure 8:
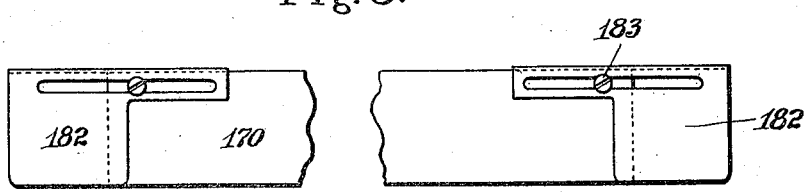

Fig. 8 is a top plan view of the yielding support or plate of the stacking device.

Figure 9:
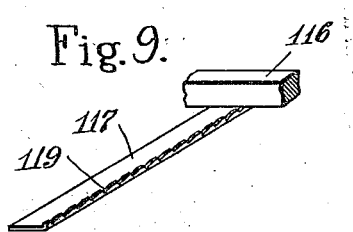

Fig. 9 is a perspective view showing a detail of structure.

Figure 10:
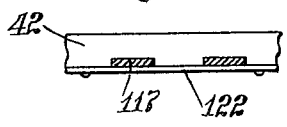

Fig. 10 is a fragmentary front elevation, partly in section on the line 10—10 of Fig. 7.

Figure 11:
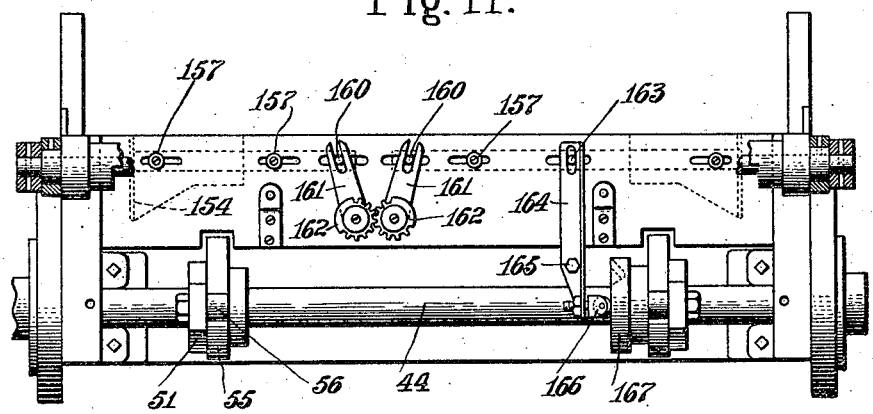

Fig. 11 is a general bottom view with certain parts removed.

Figure 12:
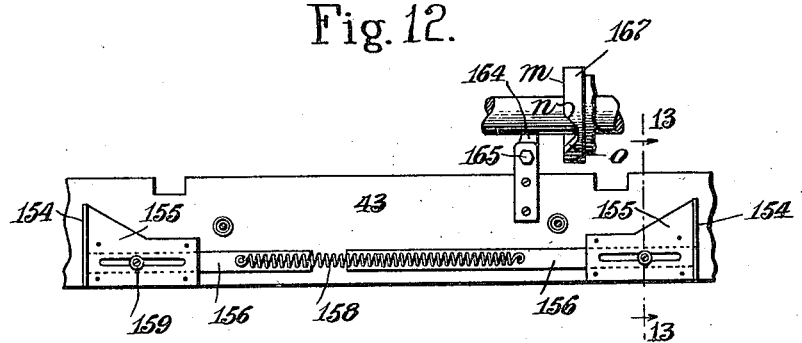

Fig. 12 is a top plan view of certain parts not sufficiently seen in Fig. 2.

Figure 13:
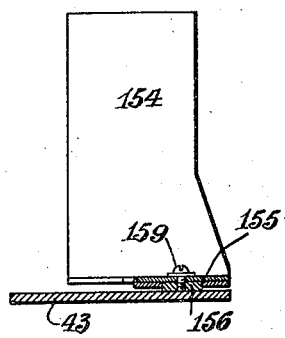

Fig. 13 is a left elevation of certain parts, partly in section on the line 13—13 of Fig. 12.

Fig. 14 is a bottom view of the member or bar 60 which is seen in top view in Fig. 2.

Fig. 15 is a similar but enlarged view, with parts omitted and others in a different position.

Fig. 16 is a partial rear elevation of the member or bar 60, with certain adjacent parts shown in section.

Fig. 17 is a left elevation, partly in section on the line 17—17 of Fig. 2, or Fig. 16.

The main machine may first be referred to, certain general frame parts 20 being indicated in Figs. 1, 2 and 3. The frame supports a bed 21, this being a horizontal member, usually hollow, and heated from the interior, upon which the unfolded blanks are initially positioned. At the extremity of a swinging arm 22 is shown a die or templet 23, adapted to be lowered upon the blanks so as to define them during the folding. The swinging of the templet may be through a connecting rod 24, shown in Fig. 1 as extending downwardly to where a cam 25 lifts and lowers it at the proper points in the cycle of operations. A suitable set of infolders 26 is employed, these arranged to approach the die from different sides, so as to fold the margins of the blanks snugly over the thin edges of the die. The actuation of the infolders may be through operating arms or levers 27 automatically swung in harmony with the other movements. The infolders may be arranged to be depressed, namely by being connected with a descending crosshead 28 located considerably below the infolders. The head 28 may be forced downwardly by a cam 29.

Power may be derived from a shaft 30 which is shown carrying a worm 31 operating to turn a worm wheel 32 secured upon an operating shaft 33. The operating shaft may directly carry the cam 29, and may be connected with the cam 25 by gears 34, and provided with or arranged to operate other or usual cams for the complete control and operation of the main machine.

The parts so far described, constituting the main machine, are not the subject of claim herein and as aforestated the details herein may be indefinitely modified so long as the main machine operates to treat successive blanks by infolding their edges, so that the blanks may be extracted and fed to the synchronized mechanism to which the present invention more particularly relates.

The novel mechanism hereof may obviously in some cases be built directly into the main machine as a part thereof, but it is capable of being constructed as a separate entity or attachment which can readily be removed bodily or can be applied to different machines. It is shown as an attachment, and as such it is secured to the main machine by triangular brackets 39 supported on upright frame parts 20. The brackets 39 support the frame work of the new mechanism, consisting of two opposite side castings 40 interconnected by suitable cross members, including the cross rod 41, having an inclined upper edge for a purpose to be described, and the cross rod 42 in the upper front part of the machine; also, there is a fixed cross plate 43 giving support to certain parts to be described.

The operation of the different parts of the attached mechanism is derived from the shaft 44 which is journaled in the side castings 40 and carries the necessary cams, etc., for the purposes of this invention. The shaft 44 is rotated in synchronism with the main machine by the following or equivalent mechanism. The operating shaft 33 is provided with a gear 45. This gear drives a pinion 46 which in turn drives a gear 47 keyed directly on the shaft 44. The pinion 46 is a mere transmitting pinion and may be suitably mounted on a special bracket 48. The gears 45 and 47 are shown of the same diameter so that the actuating shaft 44 makes one rotation for each rotation of the operating shaft 33. A correspondingly simple arrangement of transmitting gears will serve for applying the present invention to substantially any desired type of infolding machine, such gears being the only necessary operative connection between the attachment and the main machine, since the folded blanks are preferably transferred manually from the main machine to the attachment.

The supplemental or final pressing of the blanks, after removal from the main machine, and prior to their bunching or stacking, is herein effected by squeezing pressure between two members which are preferably substantially horizontal, one beneath the other. The underneath presser member 50 being substantially flat is adapted readily to receive the folded blanks removed freshly from the elevated templet. The upper presser member 60 is arranged to move relatively from above the under member so as to leave the under member open to receive the successive blanks. One of the two presser members may be fixed against up and down movement while the other moves up and down, and while the illustrated arrangement might be reversed, the under member is here shown as adapted to be lifted by power to press the successive blanks upwardly against the upper presser member. The two members are shown in the form of flat bars and as a matter of terminology may be so referred to. The under member or bar being an active one in the pressing operation will be termed the presser bar 50. According to this invention the upper presser member or bar 60 is not only fitted properly to resist the upward pressure of the presser bar 50, but is arranged to move laterally from above the presser bar. This lateral movement is herein shown as a movement frontward from above the presser bar and rearward to position over the presser bar. This gives several advantages, among them that when the upper bar is at its forward position the presser bar is accessible for receiving the blanks to be pressed and bunched. The operator has merely to reach forward, extracting the blank from the templet and bringing it down, placing it directly on the flat top surface of the presser bar. The forward movement of the upper bar is herein also utilized for the purpose of pulling or shifting forwardly the blank which has just been pressed. It operates to transfer each finally pressed blank from the presser bar 50 to a forward position where the bunching takes place. As a matter of terminology therefore the upper bar 60 may be termed the feeder bar, the two bars 50 and 60 cooperating in the manner described. One or both of the bars may be heated to increase the effectiveness of the pressing operation. It is customary in folding machines to effect pressure of the blanks on the bed of the main machine, and this bed is customarily heated, so that the blanks are pressed with heat applied from below. In the present invention I preferably heat the upper or feeder bar 60 so that in the second or final pressing heat will be applied at the top, that is to the folded edges. This greatly increases the effectiveness of the pressing and the accuracy of the finally delivered blanks.

The remainder of the description will give the details of the presser bar and its operations, and then the details of the feeder bar with its various adjuncts and operations, and finally the construction of the parts constituting the stacking or bunching mechanism, including the centering device, and the actuation of these in coordination with the parts previously described.

The presser bar 50 is fitted for upward and downward movement by means of a sliding extension 51, which may be in form of a loop or constructed with opposite slide bars which fit and slide between fixed vertical guides 52. A special arrangement is shown wherein the loop or sliding extension 51 straddles the actuating shaft 44. The parts described are best shown in Figs. 3 and 4. A strong spring 53, which is under compression, is arranged between the presser bar 50 and a fixed underneath support or shelf 54 so as to constantly force the presser bar upwardly. This spring gives the creasing pressure by which the blanks are pressed between the presser bar and the feeder bar. It is thereby possible to predetermine the pressure. The depressing of the presser bar may be effected by a cam 55 mounted directly on the shaft 44 and operating against a roller 56 mounted at the lower part of the sliding loop 51. The cam 55 has a dwell $a$ holding the presser partly down, followed by a dwell $b$ holding it fully down, followed by a dwell $c$ allowing it to rise fully to press the blank. The described elements 51 to 56 are duplicated at the two sides of the machine so that in its movements the presser bar 50 will remain strictly horizontal and parallel to the feeder bar 60 above.

The presser bar 50 at its rear side has attached to it a wedge or cam 58 taking part in the operation of smoothing the blanks, later to be described. The top surface of the presser bar also is formed with two or more grooves 59 extending forwardly and rearwardly, as indicated in dotted lines in Fig. 2 and illustrated in Fig. 17, for the reception of the feed pins, later to be described.

The feeder bar 60 may be hollow and heated by means of internal electric coils indicated at 61 in Fig. 2. This box like bar is shown provided with a cover 62. The bar 60 is intended to reciprocate frontwardly and rearwardly and for this purpose at its ends the bar is formed with guiding extensions 63, the ribs 64 of which extend into guiding engagement with grooves 65 in the side castings 40. This structure is best shown in Fig. 16.

There will now be described a convenient means of smoothing down any upstanding folds before the final pressure is actually applied. The end pieces 63 of the feeder bar 60 are formed at their lower portions with flanges 66. These flanges give support to the smoothing plates 67 and 68 at the front and rear respectively of the under side of the feeder bar. Fig. 4 shows the plates 67 and 68 partly separated. Fig. 5 shows them fully separated. Fig. 6 shows them brought together. This movement takes place as the presser rises to apply pressure. The approaching movement of the smoothing plates operates to smooth and lay down the blank folds. As the presser comes up the plates move together so that the relative movement of the plates is an inward diagonal movement considered in relation to the blanks. Thus any partly opened fold can not accidentally be crushed down or wrinkled, but will be laid smoothly in and down in place before the squeezing occurs.

The mechanism by which the smoothing plates are operated will now be described. Each plate at each end is formed with an offset section or extension 69 engaging above the guiding flange 66, already mentioned. By this the smoothing plates are maintained snugly in contact with the under side of the feeder bar 60. Indeed they form its active pressing surface. The guiding and actuating of the two plates toward and from each other may be by means of guide bars 70 and 71, each of these being duplicated near the two ends as indicated in Fig. 14, which is a bottom view. Fig. 15 shows the details on a larger scale, the smoothing plates being omitted but their positions indicated by dotted lines. The guide bars 70 and 71 operate in grooves 72 at the under side of the feeder bar. The front smoothing plate 67 is attached to the two guide bars 70 and the rear smoothing plate 68 is attached to the two guide bars 71. These bars are actuated simultaneously so as to cause the two plates simultaneously to approach. This may conveniently be effected by means of a 3-armed or T-lever 74, the ends of each of which engage in notches or recesses 75 in the bars 70 and 71 respectively. The T-lever is pivoted at 76, so that when swung it will throw one guide bar forward and the other rearward. The levers at the two ends are to be operated in harmony so that the two smoothing plates will approach or recede by the same operative action. Each T-lever 74 may be provided with a rearwardly extending arm 77 by which it is swung. A pivot 78 is shown connecting the arm 77 with an offset portion 79 of a slide bar 80. Fig. 16 shows these parts in rear elevation. The symmetrically opposite slide bars 80 are movable endwise, being guided by pin and slot devices 81. In order to throw apart simultaneously the two slide bars 80 they are each provided with a roller 82, operated by the wedge or cam 58, already mentioned, secured to the rear side of the presser bar 50. By this arrangement, as the presser bar rises the wedge cam 58 throws apart the slide bars 80, thus operating the T-levers 74 and causing the smoothing plates to approach each other. This gives the described smoothing action. Springs 83 oppose this motion and act to restore the smoothing plates when the presser subsequently descends. The inclined or cam surfaces of the wedge 58 terminate as shown and are succeeded by vertical surfaces in order that the presser bar may rise forcibly without any further tendency to move the smoothing plates toward each other, after the plates have substantially met.

For causing the bodily forward and rearward movements of the feeder bar the following convenient mechanism may be employed. Adjustably attached, by devices 84, to the actuating shaft 44 is a cam disk 85, see Figs. 5 and 6. This disk is formed with a cam groove 86 at its right side. This groove is formed with an eccentric portion $f$, concentric portion $d$ and eccentric portion $e$. A cam roll 87 engages the cam and is mounted on a slide bar 88 which extends forwardly and in turn is connected by a link 89 with an upward lever 90. This lever is connected by a link 91 with a lateral pin 92 arranged upon the guiding extremity of the feeder bar 60. The lever 90, link 91 and pin 92 are duplicated at the opposite side of the machine and the two levers 90 are connected to swing together by being both rigidly secured to a hollow shaft 94 extending across the front of the machine.

In association with the feeder bar is herein provided a pushing or feeding device adapted to extend downwardly below the feeder bar so as to engage and push forwardly the completed blank when the feeder bar moves forwardly. This device might take various forms, such as a simple pivoted pawl, adapted to become operative for the forward movement and inoperative for the return movement. In this way the device will transfer each blank forwardly from pressing to stacking position and on the return movement will not interfere with the succeeding blank. The pusher device is herein shown in the form of a plurality of pins 97 adapted to extend downwardly below the feeder bar and their lower extremities 98 adapted to engage in the grooves 59 in the top of the presser bar, as before mentioned. Fig. 17 shows the device before the presser bar has lifted. After lifting and pressing the presser bar drops partially whereupon, the feed pin 97 engaging in the groove 59 moves forwardly with the feeder bar and engages and carries forwardly the folded blank B. The two feed pins, near the opposite ends of the feeder bar, engage and move smoothly forward the completed blank, delivering it to the stacking devices.

Each feed pin 97 is fitted to slide vertically in the body of the feeder bar, and the upper end of the pin is provided with an enlargement or top piece 99, which may be screw engaged with the shank of the pin so as to permit vertical adjustment, a set screw 100 securing the parts in adjustment. The lower end of the feed pin must pass through the rear smoothing plate 68, as seen in Fig. 17, and said plate is slotted at 101 so as to accommodate the pin. A small plate 102, apertured for the passage of the feed pin, is secured to the feeder bar so that when the smoothing plates are closed together a continuous surface will be presented for pressing purposes.

In order to lift the two feed pins and drop them simultaneously there are shown a pair of rocker arms 104 mounted on a rocker rod 105, seen in Figs. 2, 16 and 17, this rod being journaled in the end pieces 63 of the feeder bar. The arms 104 are yoked and engaged between upper and lower lugs formed on the top piece 99 of each feed pin. The rocking of the rod is controlled by an arm 106 secured at its right end, this arm having a cam roll 107 at its extremity cooperating with a switch cam 108. The relation of these parts is well shown in Figs. 4 to 7. The switch cam may be a simple piece of metal inclined at both ends, as shown, and capable of rising and falling during operation, guided by a pin 109 engaging a slot 110. At its front end the switch cam has a rearward incline 111 adapted to elevate the cam roll, and at its rear end a similar incline 112 adapted to cause the switch cam to rise and permit the cam roll to pass under. These parts are accommodated in a special upward extension 113 of the machine frame at the right side. A spring 114 pulls upon the control arm 106 tending to hold it and the feed pins down. When the feeder bar 60 moves forwardly from the Fig. 4 to the Fig. 5 position the cam roll 107 passes under the switch cam, the cam therefore being inoperative. When the feeder bar moves reversely from the Fig. 5 to the Fig. 6 position the roll passes up on the switch cam. This rocks the arm 106 and the shaft 105, which causes the arms 104 to elevate the feed pins 97 so that as the feeder bar moves rearwardly the feed pins will not interfere with the blank lying on the presser bar ready to be pressed. When the roll passes off the switch cam at the rear and the feed pins are allowed to drop, they will engage at the proper time in the grooves 59 of the presser bar, as already described. In the next forward movement they will contact and push the blank forwardly.

The operation to this point is substantially as follows. The operator extracts the folded blank from the templet and deposits it upon the top surface of the presser bar. The feeder bar returning rearwardly comes above the presser bar, the feed pins being elevated during this movement, but dropping again behind the blank. The presser bar lifts and as it rises operates through the wedge cam to force the smoothing plates toward each other, smoothing down the blank folds just in advance of the actual squeezing, which takes place forcibly between the presser bar and feeder bar. The pressure is maintained for a considerable period, with heat directly on the folds. The presser bar is then partly lowered and thereupon the feeder bar starts forward, the feed pins running in the grooves in the top surface of the presser bar. Thus the completed blank is pulled forwardly across the presser bar and from it at the front passes on to the devices which receive and stack or bunch the blanks, as now to be described.

The stacking devices comprise a pair of instruments which may be termed combs as each of them is formed with a longitudinal bar, extending transversely of the machine, and a series of parallel projections or fingers which engage and manipulate the successive blanks. From the presser bar each blank is shifted directly upon the first or receiving comb 115, the blank being left there when the feeder bar moves rearwardly. The second comb 140 may be termed the depressing or packing comb, it coming down upon the blank upon the receiving comb, and when the receiving comb has been withdrawn in a forward direction, moving down further to depress and pack the blank on top of the blanks already received upon the yielding stacker support or plate 170 beneath. The receiving comb resumes its former position above the stacked blanks and depressing comb so that the latter may rise to its initial position, leaving the two combs in readiness for the reception and packing of the subsequent blank. After each blank has been received on the receiving comb and before the depressing comb has descended upon the blank centering plates or uprights 154 come into play moving toward each other from the ends and operating to properly align or center the blanks endwise so that they will be stacked in a uniform manner.

The receiving comb 115 is seen in top view in Fig. 2, in front view in Fig. 3 and in side view or section in Figs. 4 to 7. It comprises a back bar 116 and a number of parallel fingers 117 extending rearwardly from the bar and consisting preferably of thin plates or strips. In order to give these firm support as they slide forwardly and backwardly they may be engaged in a series of grooves at the underside of the fixed cross bar 42 of the machine frame. Fig. 10 shows a suitable arrangement, the bar being grooved, and the fingers held in the grooves by a plate 122 attached beneath. When the comb is in its normal or receiving position, as in Figs. 4, 5 and 6, the rear extremities of the fingers rest upon the fixed cross bar 41 of the machine frame, this bar having an inclined surface 118 to insure the fingers coming to proper place. Two or more of the fingers 117 may have a flanged or burred edge 119, as shown in Fig. 9, so that as the comb withdraws forwardly these rough edges will impose friction and tend to draw the successive blanks forwardly to a uniform position. The endmost fingers 120 of the comb 115 are slightly wider than the others and are adjustable along the back of the comb by screw and slot devices 121 so that the comb can be adapted to blanks of different length.

In order to insure the proper vertical alignment of the stacked blanks a gage or stop finger 123 is shown, or rather a plurality of them, as seen in Figs. 4, etc. When the receiving comb shifts forwardly after receiving a blank it tends to draw the blank forwardly until the front edge of the blank contacts the gages 123. This in connection with the endwise centering device, to be described, gives exactly the same position for all blanks. Each gage finger may be adjustable forwardly and backwardly by being attached to a small bracket 124 by means of an adjusting screw device 125, the bracket 124 being attached at the front side of the fixed cross bar 42, as indicated in Figs. 2, 4, etc.

The actuation of the receiving comb 115 is merely a forward withdrawing movement from underneath the received blank and at the proper time a restoring rearward movement above the blank, in position to receive the next blank. These movements may be secured in various ways. The back bar of the comb is shown of square form, the ends being continued through the guiding slot 126 of the slotted extension 127 of each side casting 40. The actuation may be derived from a cam disk 128 mounted at the left end of the shaft 44. This cam disk is formed with a cam groove 129 of generally oval form having a concentric portion $g$ followed by eccentric portions $h$ and $i$. In Fig. 7 the comb is forward and the cam portion $i$ is about to come into play to move the comb rearward where it will remain until again moved forward by the cam portion $h$. The cam groove is engaged by a follower or roll 130 mounted on a slide bar 131, which extends forwardly and at its front end is connected by a link 132 with a lever 133 that extends upwardly and at its upper end is connected by a link 134 directly with the end of the back bar 116 of the receiving comb. Lever 133 and link 134 are duplicated at the two sides of the machine and are connected by a cross shaft 135 to which both the levers 133 are connected and which forms their fulcrum. This shaft is shown surrounded by the hollow connecting shaft 94, already mentioned. Thus the comb is maintained in proper position during its forward and rearward movements. The amount of throw of the comb may be adjusted by means of the stud 136 on the link 132 and slot 137 in the lever 133.

The depressing comb 140 comprises a back bar 141 and a series of fingers 142 which first extend downwardly from the front side of the bar and then rearwardly, as indicated in Figs. 2, 3 and 4 to 7. The fingers 142 are alternated in position with the fingers 117 of the receiving comb and owing to the drop arrangement or dip of the depressing fingers the receiving fingers are enabled to withdraw from beneath the blank and return above the blank and above the depressing fingers, but beneath the back bar of the depressing comb, so that when the receiving comb is in place the depressing comb and fingers may freely rise, the receiving comb holding down the depressed blanks.

With the depressing fingers 142 are shown two fingers 143 of shorter length and bent downwardly at a different point from the main fingers. This enables these fingers to clear the blank gage 123, already mentioned. The shortened rearward extent of these fingers enables them to clear the feed pins 97 when the feeder bar comes forward. The depressing comb also has, near its ends, a pair of downwardly flanged special fingers 144, as best seen in Figs. 2 and 3. These fingers dip slightly lower than the main fingers and the two flanges are arranged to straddle the wider fingers 120 of the receiving comb. The purpose of this special arrangement is to take care of the ends of the blanks, which, owing to the bunched condition of the fabric at the corners, are somewhat thicker, having a tendency to bend up and cause interference with the feeding and stacking operations. The double flanged depressing fingers 144 snugly hold down the ends of the blanks. These fingers 144, like the fingers 120 beneath them, are adjustable longitudinally by screw and slot devices 145 so as to adapt them for blanks of varying lengths.

Having now described the depressing comb 140 and its three different kinds of fingers, a convenient mode of actuation of the comb will now be described. The depressing comb is required to move vertically and for this purpose the squared ends of the back of the comb are guided and slide in the space between the two upstanding projections 146 of the side castings 40. The actuation is from the cam disk 85, which is provided with a peripheral cam 147, best seen in Fig. 6. The disk may be circular and the cam may be a separate piece attachable as shown by screw and slot devices 148 so that the cam can be peripherally adjusted in order to alter the timing. The circular periphery of the disk 85 may constitute the first portion $j$ of this cam, corresponding to the elevated position of the comb, as seen in Figs. 4 and 5, this being followed by an elevated portion $k$ which corresponds with a partly depressed condition of the comb, as in Fig. 6, and a more elevated portion $l$ which brings about the complete depression of the comb, as in Fig. 7. It will be noticed that there are cam disks 85 and cams 147 at both sides of the machine, these working in exact unison to throw upwardly and downwardly the two ends of the depressing comb. Each cam is engaged by a follower or roll 149 indicated in Fig. 6. This roll is attached at the rear end of a lever 150 centrally fulcrumed at 151. The forward end of the lever is connected by link 152 to one end of the back bar 141 of the depressing comb. By this arrangement the comb, normally elevated as in Figs. 4 and 5, is caused to be partly depressed as in Fig. 6, contacting on top of the blank B and, after the withdrawal of the receiving comb, as in Fig. 7, further depressed to carry the blank below the level of the receiving comb, so that the latter can return to the Fig. 4 position above the blank, and the depressing comb raised to its initial position.

The centering devices of this invention may take the form of upright plates, strips or gages 154, seen in Figs. 2 and 3 and in detail in Figs. 11, 12 and 13. Each of the centering gages may extend downwardly, as shown, and at its lower end be formed with flanges or feet 155 which are supported upon the fixed cross plate 43 previously mentioned. The two centering gages are intended to be simultaneously moved toward and from each other, and to permit this movement each of them is mounted upon a guide bar 156 which engages directly upon the frame plate 43. The longitudinal sliding connection between the two bars and the plate is indicated in the bottom view of Fig. 11 in the form of pin and slot devices 157. The two guide bars 156 are in alignment and are constantly drawn toward each other by spring 158.

It is necessary to adjust symmetrically the centering gages 154 to adapt them to blanks of varying lengths and for this purpose a pin and slot connection 159 is shown for securing each gage to its guide bar 156. This adjustment corresponds with the already described adjustment of the extreme fingers of the respective combs, which fingers must be adjusted in a manner to avoid interference with the centering gages.

In order to effect simultaneous endwise movements of the centering gages their guide bars 156 are provided with pins 160 extending downwardly through the frame plate 43 as indicated in Fig. 11. One pin is shown for each guide bar and the two pins are shown as engaging the forked ends of two short levers 161 which are pivoted adjacent to each other and interconnected by gears 162. By actuating one of the plates the two will move simultaneously. This actuation may be effected through another pin 163 extending downwardly from one of the guide bars, the same engaging a swinging lever 164 having a fixed fulcrum at 165, the rearward extension of the lever carrying a cam roll 166 engaging a cam 167 on the shaft 44. The roll may be adjustable, as indicted in Fig. 11, and the cam is shown as having a dwell $m$ and two operative inclines $n$ and $o$, which serve at the proper time, immediately after a blank has been deposited on the receiving comb, to allow the centering gages, pulled by the spring 158, to approach symmetrically, lightly contacting the ends of the blank and thereby positioning it centrally.

The blank thus being positioned endwise by the centering gages and in the other direction by the gages 123 is in readiness to be depressed and bunched or stacked with the preceding blanks. The stack of blanks B is indicated as resting upon a stacker plate or support 170, which is capable of receding as the stack increases. The stacker plate 170 is shown as having attached beneath it near each end a guide block 171 which runs along a fixed guide plate 172. The block 171 is shown as having a forwardly extending portion or finger 173 by which the stacker may be bodily depressed when it is desired to release or remove the stack of blanks. The plate 170 may be held up by means of rods 174 which extend downwardly from its under side, passing through sleeves 175. In order to support yieldingly the plate 170 springs 176 are provided, surrounding the rods 174 and passing loosely through the sleeves 175; brackets 177 constitute abutments for the lower ends of the springs and guides for the lower ends of the rods. By this arrangement the accumulating pressure of the blanks causes the gradual yield of the stacker, and when the required number of blanks has been received the finger 173 may be depressed manually to permit their extraction. As a guide for the front side of the stacker plate and for the descending column of blanks is shown a pair of strips 178. These two may be connected by a horizontal strip 179 so as to form a gate, which is shown pivoted at its upper extremity to the fixed bracket 125, with a spring 180 pressing upon the gate, tending to throw it forward. A simple latch device 181 is shown for holding the gate in its closed position as in Fig. 4. In extracting the blanks this latch will be released and the gate swung forward. When the gate is closed its upright strips 178 form a downward continuation of the guide fingers 123, the two acting to guide the blanks downward in proper alignment. As shown in Fig. 8 the stacker plate 170 may be adjustable in length by means of separate end pieces 182 having screw and slot connections 183 with the plate.

The sequence of operations may be somewhat varied but herein, according to the timing of the several cams 55, 86, 108, 129, 147 and 167, the operations may be substantially as follows: It has been explained that the mechanism of the present attachment is timed in harmony with that of the main machine, namely, by the original disposition of the gears 45, 46 and 47. The templet 23 is shown elevated so that the operator may readily detach the folded blank thereon and by the time he is ready to place it on the presser bar 50 the feeder bar 60 will have moved forward to the Fig. 5 position. This is the essential relation between the main machine and the attachment. At the same time that the folded blank is shifted from the templet to the presser bar the operator may place a new unfolded blank on the bed. In this way three blanks are being operated on at once, as the preceding blank is being disposed in the stacking mechanism.

Figs. 1, 2, 3 and 4 show the parts in that stage of operation which may be described as follows: The presser bar 50 has descended to its half way position, cam $55^a$ in effect. The feeder bar 60 is still above the presser bar and about to be moved forwardly, through the cam portion $86^e$. The feed pins 97 are down. The receiving comb 115 is back, the cam dwell $129^g$ being in effect. The depressing comb 140 is held elevated through the cam portion $147^j$.

In the interval between the positions of Figs. 4 and 5 the feeder bar moves fully forward, through cam $86^f$, carrying the blank forward upon the receiving comb which is still in its rearward position. The presser bar has fully descended in Fig. 5, through cam $55^c$, and is in readiness to receive the subsequent blank, its lowered position simplifying the restoration of the feeder bar above the presser bar without disturbing the blank.

In the interval between the positions of Fig. 5 and Fig. 6 the feeder bar moves back, through cam $86^f$, where it dwells through cam $86^d$, and in Fig. 6 is above the new blank. As the feeder bar moves back the switch cam 108 lifts the feed pins so as to clear the new blank. The feed pins have again dropped in Fig. 6. In this interval the presser bar has risen and in Fig. 6 is fully up, squeezing the blank forcibly against the heated feeder bar, represented by cam portion $55^b$. During the lifting of the presser bar the smoothing plates 67 and 68, which are separated in Fig. 5, are brought together as in Fig. 6. The receiving comb has not yet started forward, but in this interval the centering gages 154 have moved toward each other and apart, centering the blank endwise, through the action of cam surfaces $167^n$ and $167^o$, the dwell $167^m$ holding the gages apart for the balance of the cycle. Also the depressing comb has moved down upon the blank on the receiving comb through cam portion $147^k$; but it will not have contacted the blank until after the centering devices have operated. Cam portion $149^k$ is a dwell, and in Fig. 6 the depressing comb is pausing in this position.

In the interval between the positions of Fig. 6 and Fig. 7 the parts remain as described with the exception that the receiving comb has moved forward, through cam $129^h$, during the pause in the descent of the depressing comb, followed immediately by the complete descent of the depressing comb, through cam portion $147^l$. This lowers the blank below the level of the receiving comb and stacks it with the blanks that have preceded it. During all this time the succeeding blank remains under pressure.

In the interval between the positions of Fig. 7 and Fig. 4 the receiving comb, through cam $129^i$, moves rearwardly to its position over the previous blank and in readiness to receive a new one, while the depressing comb, starting upwardly after the receiving comb has moved back, rises to its initial position, leaving clearance for the feeder bar to move under it in bringing the succeeding blank to the receiving comb. During this period also the presser bar descends part way so that the feeder bar may start forward. This completes the cycle of operations.

It will thus be seen that there has been described a folding machine for collar and cuff blanks comprising the main machine and an attachment, embodying the principles and attaining the advantages of the present invention. Many matters of arrangement, combination, design, mode of operation and detail can be reversed or modified in many ways without departing from the underlying principles and it is therefore not intended to limit the invention to such matters except in so far as specified in the appended claims.

What is claimed is:

1. In a folding machine, mechanism for supporting, defining and infolding the edges of blanks, a lower member adapted to receive the successive infolded blanks after disengagement from the supporting, defining and infolding mechanism, an upper member above the lower member, said members fitted for relative approach and recession of one of them to squeeze and then release each blank and relative lateral movement of one of them to bring said members into and out of operative relation, and means for actuating the infolding mechanism and said members in coordination.

2. Machine as in claim 1 and wherein the lower member is arranged flatwise and fitted to rise and descend, and the upper member is fitted to move to and from a position over the lower member.

3. Machine as in claim 1 and wherein the lower member is arranged flatwise and fitted to rise and descend, and the upper member is fitted to move to and from a position over the lower member, and to feed the pressed blank from the lower member when moving therefrom.

4. Machine as in claim 1 and wherein the lower member is arranged flatwise and fitted to rise and descend, and the upper member is fitted to move to and from a position over the lower member, and to feed the pressed blank from the lower member when moving therefrom; together with a device for receiving successive blanks so fed by the upper member and stacking the same under pressure, and means for actuating the stacking device in coordination with said members.

5. In combination with a machine containing a blank defining templet, folding mechanism, and an operating shaft, an attached supplemental mechanism comprising a flatwise presser member independent of said templet and folding mechanism, a laterally shiftable feeder member thereover adapted to cooperate with the presser member in squeezing the blank and then to feed the blank from the presser member, means for receiving pressed blanks fed by the feeder member from the presser member, and an actuating shaft for the pressing and feeding movements, geared in coordination with said operating shaft.

6. Mechanism for creasing infolded blanks for collars and cuffs, comprising a lower flat member adapted to receive and support an infolded blank during pressing, an upper member adapted to cooperate with the lower member in pressing the blank, means for causing relative lateral movements between said members to bring them alternately into receiving and pressing positions, and means for causing relative squeezing movements between said members when the blank lies between them to crease the infolds thereof.

7. Mechanism as in claim 6 and wherein the upper member has means whereby the lateral movement from pressing position feeds the creased blank from the lower member.

8. Mechanism as in claim 6 and wherein the lower member is fitted to rise to press the blank against the upper member, and the upper member is fitted to move laterally and to feed the blank from the lower member.

9. In a creasing mechanism for infolded blanks the combination of a presser bar arranged to receive and support an infolded blank flatwise and to rise and drop, a feeder bar arranged above the presser bar to resist the upward movement in squeezing the infolds of the blank, and to shift away laterally and feed the blank from the presser bar after pressing and return above the presser bar after a new blank is in position.

10. The combination of claim 9 and wherein the presser bar has means to operate it to descend partially after pressing and there pause while the feeder bar shifts laterally away, and then to descend further before the feeder bar returns.

11. The combination of claim 9 and wherein the presser bar operates to descend partially after pressing and there pause while the feeder bar shifts laterally away, and then to descend further before the feeder bar returns; and the feeder bar having depending means adapted to engage the pressed blank on the partially lowered presser bar but to clear the new blank placed on the fully lowered presser bar.

12. The mechanism as in claim 6 and wherein the upper member is provided with depending means adapted to engage and remove the pressed blank from the lower member during the lateral shifting but to avoid disturbing a new blank when the upper member is restored.

13. The combination of claim 9 and wherein depending means are provided on the feeder bar adapted to engage and feed each pressed blank from the presser bar without disturbing the succeeding blank as the feeder bar returns.

14. The mechanism as in claim 6 and wherein the upper member has its operative surface provided with movable smoothing plates, and means for causing said plates to approach as the blank receives squeezing pressure.

15. The combination of claim 9, and wherein the feeder bar has at its under surface a plurality of smoothing plates, and means to cause the approach of said plates as the pressure is applied to the blanks.

16. The combination of claim 9, and wherein the feeder bar has at its under surface a plurality of smoothing plates, and means to cause the approach of said plates as the pressure is applied to the blanks, consisting of a cam operated by the rise of the presser bar.

17. The combination of claim 9, and wherein the feeder bar has at its under surface a plurality of smoothing plates, and means to cause the approach of said plates as the pressure is applied to the blanks, consisting of a cam operated by the rise of the presser bar, said cam having symmetrical inclines followed by dwells, with followers symmetrically connected with said smoothing plates.

18. The combination of claim 9, and wherein the feeder bar has at its under surface a plurality of smoothing plates, and means to cause the approach of said plates as the pressure is applied to the blanks, consisting of a cam operated by the rise of the presser bar to cause the mutual approach of the plates, and thereby slanted inward resultant movements relatively to the edges of the blanks.

19. The combination of claim 9 and wherein the feeder bar is provided with feed pins adapted to depend to the presser bar, the presser bar formed with grooves in which the pins travel, and means for lifting the pins to inoperative positions for the feeder bar return movements.

20. The combination of claim 9 and wherein the feeder bar is provided with feed pins adapted to depend to the presser bar, the presser bar formed with grooves in which the pins travel, and means for lifting the pins to inoperative positions for the feeder bar return movements, consisting of a switch cam arranged for the elevation of the pins on the return movement.

21. The combination of claim 9 and wherein the feeder bar is provided with feed pins adapted to depend to the presser bar, the presser bar formed with grooves in which the pins travel, and means for lifting the pins to inoperative positions for the feeder bar return movements, the presser bar being operated between three positions, pressing position, a partly lowered position, with the feed pins in its grooves, and a further lowered position.

22. In a creasing mechanism for infolded blanks the combination of a pressing member and a feeding member, means for pressing them together to crease a folded blank between them, means for operating them so that the feeding member shifts the blanks laterally after each pressing, and a bunching device comprising a flatwise receiving member upon which each blank is shifted, and a depressing member.

23. The combination of claim 22 and wherein is a longitudinally centering means acting after the receiving member receives a blank and before the depressing member engages it.

24. The combination of claim 22 and wherein the receiving and depressing members consist of two combs with intermeshing fingers, so constructed that the fingers of the depressing comb may descend from above to below the receiving comb, and means for actuating the combs whereby the depressing comb descends to the blank on the receiving comb and pauses, while the receiving comb withdraws from beneath the blank, the depressing comb descending further, and the receiving comb returning above the blank.

25. The combination of claim 22 and wherein the receiving and depressing members are adjustable in length for varying blanks.

26. The combination of claim 22 and wherein the receiving and depressing members are adjustable for varying blanks and a longitudinal centering means also adjustable for varying blanks.

27. The combination of claim 22 and wherein the receiving and depressing members consist of two combs with intermeshing fingers so constructed that the fingers of the depressing comb may descend from above to below the receiving comb, and means for actuating the combs whereby the depressing comb descends to the blank on the receiving comb and pauses, while the receiving comb withdraws from beneath the blank, the depressing comb descending further, and the receiving comb returning above the blank; the receiving comb adapted to draw the blank along in its withdrawing movement until the blank comes to a positioning gage; and such positioning gage, acting to position each of the successive blanks before the second descent of the depressing comb.

28. The combination of claim 22 and wherein the receiving and depressing members consist of two combs with intermeshing fingers so constructed that the fingers of the depressing comb may descend from above to below the receiving comb, and means for actuating the combs whereby the depressing comb descends to the blank on the receiving comb and pauses, while the receiving comb withdraws from beneath the blank, the depressing comb descending further, and the receiving comb returning above the blank; together with a downwardly yielding support for a stack of blanks, arranged beneath, and opposing the second descent of, the depressing comb.

In testimony whereof, I have affixed my signature hereto.

GARRY J. DORMANDY.